United States Patent [19]

Ferri et al.

[11] Patent Number: 6,014,600
[45] Date of Patent: Jan. 11, 2000

[54] EMERGENCY BRAKE READBACK HARDWARE AND FAULT DIAGNOSTICS ROUTINE

[75] Inventors: Vincent Ferri, Pittsburgh; Robert D. Dimsa, Elizabeth, both of Pa.

[73] Assignee: Westinghouse Air Brake Company, Wilmerding, Pa.

[21] Appl. No.: 08/922,470

[22] Filed: Sep. 2, 1997

[51] Int. Cl.[7] .................................................. B60T 15/00
[52] U.S. Cl. .............................................. 701/29; 701/19
[58] Field of Search ....................... 701/29, 19; 340/438; 303/122, 128

[56] References Cited

U.S. PATENT DOCUMENTS

| | | | |
|---|---|---|---|
| 4,830,437 | 5/1989 | Rumsey | 303/18 |
| 4,944,564 | 7/1990 | Balukin et al. | 303/33 |
| 5,721,683 | 2/1998 | Joyce, Jr. et al. | 701/70 |
| 5,791,744 | 8/1998 | Wood et al. | 303/7 |
| 5,808,370 | 9/1998 | Bezos | 307/9.1 |
| 5,820,226 | 10/1998 | Hart | 303/7 |

Primary Examiner—Michael J. Zanelli
Attorney, Agent, or Firm—James Ray & Associates

[57] ABSTRACT

A circuit for diagnosing component problems in the circuit and for immediately recognizing an emergency brake application command in a locomotive. The circuit includes a coil of an emergency magnet valve connected to a trainline providing positive DC voltage to the coil and circuit, and a diode connecting the coil to a switch of a brake handle and to a light emitting device. The brake handle switch and light emitting device are connected to the negative side of the trainline, with the light emitting device providing an immediate indication of an emergency brake application command effected by the closing of the brake handle switch.

9 Claims, 1 Drawing Sheet

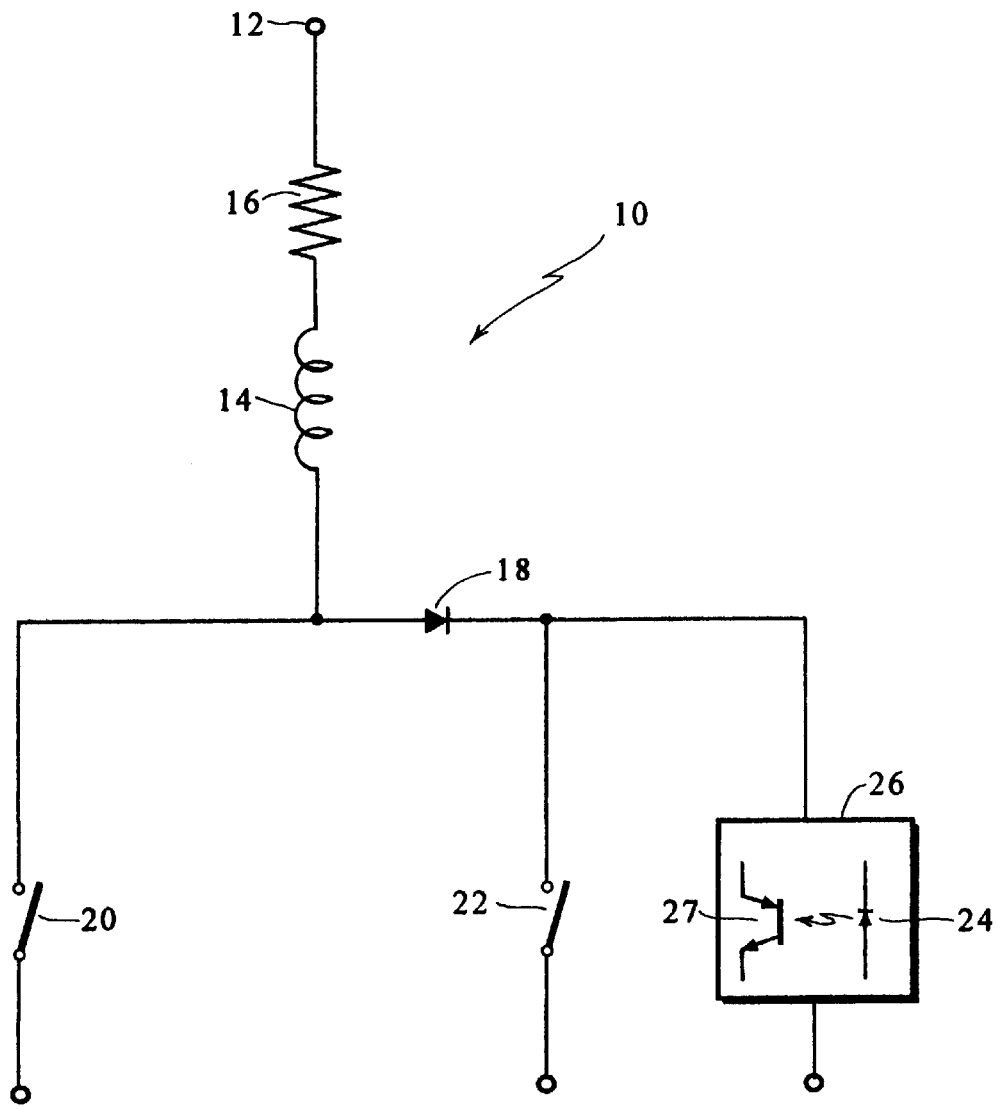

EMERGENCY BRAKE READBACK HARDWARE AND FAULT DIAGNOSTICS ROUTINE

FIELD OF INVENTION

The present invention relates, in general, to railway locomotive brake equipment and, more particularly, this invention relates to a hardware circuit which provides fault mode and effects analysis that solves a delay problem in computer reporting of an emergency brake application in a locomotive.

BACKGROUND OF THE INVENTION

In present day electronic remote control systems which use radio communication between the lead and slave locomotives disposed in a train consist, the software of a brake control computer in the lead locomotive runs certain routines when it receives an emergency brake control signal from a switch operated by an operator's brake handle.

As is well known in the railway braking art, an emergency brake application dumps air from a pneumatic brake pipe of the locomotives and cars connected to the locomotives. The on-board computer will note the resulting rapid reduction of air pressure in such brake pipes, and proceeds to check for possible other causes of such reduction before indicating the handle initiated emergency event.

Other possible causes of a rapid reduction in brake pipe air pressure can be, for example, a broken brake pipe or a loss of electrical power. Loss of electrical power will, for safety reasons, necessarily cause an emergency brake voltage to be generated.

SUMMARY OF THE INVENTION

The present invention provides immediate recognition of an emergency brake command in the cab of a locomotive and a simple hardware circuit for diagnosing electrical problems that may occur when emergency braking is ordered by operation of a brake valve handle in the cab of the locomotive. The hardware circuit includes the solenoid, or coil, of an emergency magnet valve electrically connected to an emergency switch of the brake handle and to an emergency brake function provided by distributed electrical power equipment located in a locomotive and on an associated train of cars. In addition, the solenoid of the magnet valve is connected to a light emitting means, such as an LED, powered by an electronic remote control brake system on the locomotive. A diode electrically connects the solenoid, or coil, of the magnet valve to the brake handle switch and LED in a manner that blocks current flow from the emergency brake function of the distributed power equipment to the brake handle switch and LED.

The hardware circuit of the present invention is connected to an electrical trainline providing a positive DC voltage employed to operate the emergency magnet valves. The trainline and hardware circuit include a negative side commonly connected to the negative terminal of a locomotive battery.

OBJECTS OF THE PRESENT INVENTION

It is, therefore, one of the primary objects of the present invention to provide an immediate recognition of a brake handle initiated emergency brake application command while a brake control computer runs routines before reporting such emergency brake application command.

Another object of the present invention is to provide diagnostics and analyses of circuit problems that may occur during emergency braking of a train while providing the above immediate recognition of an emergency brake application command.

Yet another object of the present invention is to use electrical power supplied directly from a positive control trainline to provide the immediate recognition of emergency braking.

In addition to the various objects and advantages of the present invention which have been described above, various other objects and advantages of the invention will become more readily apparent to those persons who are skilled in the railway braking art from the following more detailed description of the invention, particularly, when such description is taken in conjunction with the attached drawing and with the appended claims.

BRIEF DESCRIPTION OF THE DRAWING

The FIGURE is a schematic diagram of the diagnostic hardware circuit according to a presently preferred embodiment of the invention.

BRIEF DESCRIPTION OF A PRESENTLY PREFERRED EMBODIMENT OF THE INVENTION

Referring now to the drawing, a circuit 10 is shown having a positive side connected to the positive side of an electrical control trainline at a terminal location 12. Circuit 10 includes the solenoid or coil 14 of an emergency magnet valve (not otherwise depicted) having one side connected to terminal 12 via a series resistor 16 while the other side is connected to a diode 18. Diode 18 connects coil 14 to a switch 20 of an emergency brake function provided by a distributed power system (not shown) of the locomotive. Diode 18 also connects coil 14 to a brake handle switch 22 and to a light emitting device 24 connected in parallel switch 22, such as a light emitting diode (LED) located on a printed circuit board 26. The LED and circuit board are part of a remote brake control system such as the EPIC system developed by the Westinghouse Air Brake Company. Diode 18 electrically separates switch 20 from brake handle switch 22 and LED 24.

When emergency brake handle switch 22 is closed the positive voltage supplied at 12 from the trainline causes current to flow serially through resistor 16, solenoid 14, diode 18 and switch 22 to an common negative side of the switch. The LED 24 is energized by current flow from its positive side through the closed brake handle switch 22 to the common negative of the switch and trainline. The LED emits light to a detector 27 located in close proximity to the LED, the detector being in a circuit that indicates immediately emergency closing of switch 22. Solenoid 14 of the emergency magnet valve) mechanically positions valve ports (not shown) to dump air from the brake pipe that extends the length of the train to effect rapid application of the train brakes.

When the brake handle in placed in an emergency position by the engineer, the contacts of switch 22 close causing energization of solenoid 14 and the operation of its magnet valve. Another emergency magnet valve (not shown) is employed in the EPIC® system to dump air from the brake pipe of a train. This valve is controlled by the EPIC® brake control computer and associated electronic circuitry. Software logic detects emergency positioning of an automatic brake valve handle, but this control is not available if power to the EPIC® system is shut off.

The closing of switch 20 also is effective to energize coil 14 of the emergency magnet valve, as current flows through the coil to the common side of the switch through its closed contacts but does not energize LED 24, as diode 18 blocks the flow of current in the LED circuit. If, therefore, switch 20 fails in a shorting mode, the magnet valve of coil 14 does not de-energize. If switch 20 fails in an open mode, coil 14 is not energized, as no current path is provided by the switch. In either case, the diagnostic result is the inability to detect failure modes of switch 20.

In the event diode 18 shorts, the electronic brake system shows an emergency brake command if switch 20 or 22 is closed, as the LED 24 outputs a light signal to associated detector 27, i.e., current flows from the LED through either one of the closed switches 20 or 22. If the emergency brake command is from switch 20, the failure of diode 18 would be detected because of a conflicting brake handle position showing switch 22 open yet light would be emitted by the LED indicating an emergency brake condition.

If diode 18 faults in an open mode the electronic brake system detects that an emergency brake command has been issued by the closing of switch 22 (via the brake handle) since LED 24 is energized by current flow in the circuit completed by the closing of the switch. Yet, the emergency valve of coil 14 does not operate, as the path for current flow is interrupted by the open diode. The brake handle position provides encoded instructions to the EPIC® emergency valve discussed above to enforce emergency brake operation, i.e., EPIC® Software can detect for circuit discontinuity within resister 16, the coil of emergency valve 14 and diode 18 by comparing the emergency command received from feedback element 24 and the actual state in which EPIC® is operating via its encoder position status.

If brake handle switch 22 becomes shorted, an emergency condition is active regardless of handle position, as solenoid 14 is energized by current flow from terminal 12 to the common side of the switch. The failure (short) of switch 22 is detected by a conflict between handle encoder position of the handle and the feedback of LED 24, which is also energized by current flow through the shorted switch. The magnet valve of solenoid 14 remains energized, as current flows through shorted switch 22.

If, on the other hand, switch 22 is in an open failure mode, an emergency condition is detected by the automatic brake handle encoder of the above EPIC® brake system and the EPIC® emergency magnet valve. The LED 24 is not energized, as the path for current flow is blocked by the open switch 22. Solenoid 14 is also not energized for the same reason. This failure is detected by a conflict between the brake handle position of switch 22 (which is in a emergency position, with the handle encoder signaling an emergency) and the "silent" LED having its circuit interrupted by the open switch 22.

A shorted coil 14 cannot be detected by diagnostic circuit 10, and coil 14 would, of course, provide no emergency function since its magnet valve cannot be actuated. An emergency brake condition is, however, provided by the EPIC® emergency valve if the brake handle of the above EPIC® system is moved to an emergency position. An emergency brake condition is not provided if only the distributed power equipment is initiated, as it and switch 20 have no control over the EPIC® emergency valve.

An open failure condition of coil 14 is also not detectable by circuit 10 but emergency braking occurs via the EPIC® magnet valve if the brake handle of the EPIC® system is suitably initiated. Emergency braking does not occur if only switch 20 is initiated, as no current flows through the open circuit of coil 14. As stated earlier, with an open coil the magnet valve of the coil is not operable.

A shorted resistor 16 is not detectable by circuit 10 but emergency braking occurs via coil 14 and its magnet valve along with that of the EPIC® magnet valve if the brake handle of switch 22 is suitably initiated. If the emergency brake function of switch 20 is used, emergency braking is effected by the magnet valve of coil 14 only.

An open resistor 16 also not detectable by circuit 10 and current is not provided for energization of coil 14 and actuation of its valve. However, emergency braking occurs via the EPIC® emergency magnet valve if the brake handle of switch 22 is suitably initiated.

Open and shorted failure modes of the LED 24 are detectable by comparing the concurrence of brake handle position of switch 22 and LED status, i.e., if the LED malfunctions or if the circuit of the LED is open, no light output is provided and no information is provide by detector 27, yet the emergency brake switch 22 is closed.

Similarly, if the brake handle is not in an emergency position but should be, no circuit path is completed for LED 24 via switch 22. The operator notes this condition and moves the handle to the emergency position. This closes switch 22. When switch 22 is closed, the LED is energized and provides immediate indication of the closing and thus an immediate indication of emergency braking via the detector circuit 27 receiving light from the LED. While the presently preferred embodiment for carrying out the instant invention has been set forth in detail above, those persons skilled in the braking art to which this invention pertains will recognize various alternative ways of practicing the invention without departing from the spirit and scope of the following claims appended hereto.

We claim:

1. A circuit for diagnosing component problems in a circuit and for immediately indicating an emergency brake application command in a railway locomotive, said circuit comprising:
   (a) a coil of an emergency magnet valve connected to a trainline providing positive DC voltage to both said coil and said circuit; and
   (b) a diode connecting said coil to a switch of a brake valve handle and to a light emitting device, said switch and said light emitting device being connected to a negative side of such trainline, and said light emitting device providing an immediate recognition of an emergency brake application command effected by a closing of a brake handle switch.

2. The circuit, according to claim 1, wherein a second emergency brake function is provided by a switch connected to said diode and to said coil of said emergency magnet valve.

3. The circuit, according to claim 1, wherein a series resistor connects said coil of said emergency magnet valve to a positive trainline.

4. The circuit, according to claim 1, wherein a light detector is located to receive light from said light emitting device.

5. The circuit, according to claim 1, wherein said light emitting device is a light emitting diode.

6. A method of diagnosing component problems in a circuit providing immediate recognition of an emergency brake application command in a locomotive effected by a closing of a brake handle switch, said method comprising the steps of:
   (a) using a trainline to provide a positive DC voltage to a coil of an emergency magnet valve connected between such brake handle switch and a trainline and to a light emitting device connected in electrical parallel with such brake handle switch;

(b) closing said switch to energize said coil and effect operation of said emergency magnet valve and to energize said light emitting device; and (c) detecting light emitted by said light emitting device to provide immediate recognition an emergency brake application command.

7. The method, according to claim 6, wherein said method includes the additional step of using said circuit to determine an existence of open and shorted conditions of such brake handle switch, a coil of said emergency magnet valve and said light emitting device.

8. The method, according to claim 6, wherein said method includes the additional step of determining a second emergency brake function by electrically connecting a switch to a coil of said emergency magnet valve.

9. The method, according to claim 6, wherein said method includes the additional step of electrically connecting a diode between a coil of said emergency magnet valve and a brake handle switch and using said circuit to determine if said diode is one of open and shorted.

* * * * *